United States Patent
Lu et al.

(10) Patent No.: US 11,175,005 B2
(45) Date of Patent: Nov. 16, 2021

(54) LIGHT-EMITTING ASSEMBLY WITH MICRO HYDRAULIC POWER GENERATOR

(71) Applicant: PPI XIAMEN INDUSTRY CO., LTD., Xiamen (CN)

(72) Inventors: Wenrong Lu, Xiamen (CN); Wei Yang, Xiamen (CN)

(73) Assignee: PPI XIAMEN INDUSTRY CO., LTD., Xiamen (CN)

(*) Notice: Subject to any disclaimer, the term of this patent is extended or adjusted under 35 U.S.C. 154(b) by 0 days.

(21) Appl. No.: 17/225,141

(22) Filed: Apr. 8, 2021

(65) Prior Publication Data
US 2021/0317961 A1  Oct. 14, 2021

(30) Foreign Application Priority Data
Apr. 8, 2020  (CN) .......................... 202020502643.7

(51) Int. Cl.
| | |
|---|---|
| *F21S 9/04* | (2006.01) |
| *F21V 31/00* | (2006.01) |
| *F21V 23/06* | (2006.01) |
| *F21V 3/00* | (2015.01) |
| *F21V 23/04* | (2006.01) |
| *H02K 7/18* | (2006.01) |
| *F03B 3/12* | (2006.01) |

(Continued)

(52) U.S. Cl.
CPC ............... *F21S 9/046* (2013.01); *F03B 3/12* (2013.01); *F03B 13/10* (2013.01); *F21V 3/00* (2013.01); *F21V 23/0442* (2013.01); *F21V 23/06* (2013.01); *F21V 31/005* (2013.01); *H02K 7/1823* (2013.01); *F05B 2220/706* (2013.01); *F05B 2240/20* (2013.01); *F05B 2240/57* (2013.01); *F05B 2240/85* (2020.08); *F21Y 2115/10* (2016.08)

(58) Field of Classification Search
None
See application file for complete search history.

(56) References Cited

U.S. PATENT DOCUMENTS

| | | | |
|---|---|---|---|
| 8,686,586 B1 | 4/2014 | Tsai | |
| 2008/0315015 A1* | 12/2008 | Hu | .......................... F21S 9/046 239/381 |

FOREIGN PATENT DOCUMENTS

| | | | |
|---|---|---|---|
| CN | 203067162 U | 7/2013 | |
| DE | 202013102912 U1 * | 7/2013 | ............... B05B 3/04 |

* cited by examiner

*Primary Examiner* — Britt D Hanley
(74) *Attorney, Agent, or Firm* — Bayramoglu Law Offices LLC

(57) ABSTRACT

A light-emitting assembly with a micro hydraulic power generator includes a power generation module and a light-emitting module. The power generation module includes a housing, a coil module and an impeller. An accommodating space inside the housing is divided by a transverse baffle therein into two cavities, respectively a coil cavity and an impeller cavity. A side wall of the impeller cavity is provided with at least one water inlet. At least one internally recessed portion is provided at a connection portion between the transverse baffle and an outer wall of the coil cavity, and the transverse baffle defines a water outlet at a portion positionally corresponding to the internally recessed portion. The coil module is arranged in the coil cavity in a sealed manner (Continued)

by a colloidal material. The impeller is placed in the impeller cavity, the impeller can be rotated by an external force.

10 Claims, 22 Drawing Sheets

(51) Int. Cl.
    *F03B 13/10*     (2006.01)
    *F21Y 115/10*     (2016.01)

LIGHT-EMITTING ASSEMBLY WITH MICRO HYDRAULIC POWER GENERATOR

CROSS REFERENCE TO RELATED APPLICATIONS

This application is based upon and claims priority to Chinese Patent Application No. 202020502643.7, filed on Apr. 8, 2020, the entire contents of which are incorporated herein by reference.

FIELD OF THE INVENTION

The present disclosure belongs to the technical field of kitchen and bathroom appliances, and particularly relates to a light-emitting assembly with a micro hydraulic power generator.

BACKGROUND OF THE INVENTION

With the improvement of people's living quality, the use of technology in various fields is further refined. In the field of kitchen and bathroom appliances, for example, bath and shower accessories, kitchen and bathroom products that can output hot water have also been developed.

However, in the process of practical use, it is necessary to activate certain lighting effects (lighting or visual effects) while water is being used in some scenes; or because it is not easy to control the temperature of the hot water, in the process of water output, especially when the water outlet device is just turned on, the hot water that flows out suddenly may scald the user, and it needs to have the water temperature indicated. However, in the conventional technology, to meet these design requirements, it is required to additionally design circuits, and in particular a special power supply (or battery) to supply power, which may increase the cost in practical applications.

Later, a light-emitting assembly with a micro hydraulic power generator, e.g. that in Chinese patent CN203067162U, is developed in the industry. However, the micro hydraulic power generator has a poor light-emitting efficiency, and once the light-emitting module or the micro hydraulic power generator fails, the entire light-emitting assembly will be scrapped and the cost of use is high. Moreover, in some conventional hydraulic power generators in the industry, the water inlets are arranged at the top, and power is generated by water's impacting the impeller from top to bottom, which also causes issues of low power generation efficiency.

SUMMARY OF THE INVENTION

An aspect of the present application is to provide a light-emitting assembly with a micro hydraulic power generator which has a high power generation efficiency and low cost of use.

In order to achieve the above aspect, a light-emitting assembly with a micro hydraulic power generator is disclosed according to the present application, which includes a power generation module and a light-emitting module. The power generation module includes a housing, a coil module and an impeller, an accommodating space inside the housing is divided by a transverse baffle into two cavities, respectively a coil cavity and an impeller cavity, and the transverse baffle is provided with a first perforation at the center thereof. A side wall of the impeller cavity is provided with at least one water inlet, and at least one internally recessed portion is formed in an outer wall of the coil cavity, and the transverse baffle defines a water outlet at a portion positionally corresponding to the internally recessed portion.

The impeller is disposed in the impeller cavity, an impeller cover is provided at an outer end of the impeller cavity, the impeller includes a conical base and multiple blades. The conical base is provided with a second perforation at the center thereof, and the multiple blades are arranged on an upper part of the conical base and face towards the impeller cover. The blades are arranged vertically on the conical base to be intersected with the conical base, and the blades extend outwardly from the center of the conical base and have the same circular-arc curvature.

The coil module is watertightly encapsulated in the coil cavity by a colloidal material. An input shaft of the coil module passes through the first perforation in the transverse baffle and is fixedly connected to the second perforation in the conical base of the impeller, and a power output end of the coil module is arranged outside the coil cavity.

The light-emitting module includes a circuit board, an LED lamp, a transparent lampshade, and a power cable. The circuit board is provided with an LED lamp, and the circuit board and the LED lamp are watertightly encapsulated by a transparent colloidal material, and the obtained part as a whole is encapsulated watertightly in the transparent lampshade. The power cable has one end electrically connected to the circuit board, and the other end passing through the transparent colloidal material to be electrically connected to the power output end of the coil module. With the transparent lampshade being detachably connected to the housing, the light-emitting module is detachably connected to the power generation module.

Water flow flows in through the water inlet of the impeller cavity, driving the impeller to rotate, and further driving the input shaft of the coil module to rotate together, so that the coil module generates power and supplies the power to the light-emitting module, to light the LED lamp of the light-emitting module.

According to the above solution, the power generation module has the coil module and the impeller watertightly encapsulated in the housing, and the transparent lampshade of the light-emitting module is detachably connected to the housing, so that the power generation module is detachably connected to the light-emitting module, thus, once the coil module fails or the light-emitting module fails, the respective modules can be replaced to extend the service life of the entire assembly.

Further, the side wall of the impeller cavity is provided with multiple water inlets obliquely, and the cross section of each of the water inlets forms a tapered passage from the outside to the inside. The water flow flows into the impeller cavity after being obliquely cut and pressed by the water inlets, and the impacting direction of the water flows is towards the inner concave surfaces of the blades of the impeller.

The above design can increase the area of impacting on the impeller by the water flow. Under the premise of the same water pressure, the rotation speed of this type of impeller improves the power generation efficiency of the coil module due to its different arrangement of the blades from those in the conventional technology.

Further, a temperature sensor is additionally provided in the power generation module, the transparent lampshade is provided with a through hole, and an electrical connection end of the temperature sensor is disposed in the transparent lampshade in a watertightly sealed manner and electrically connected to the circuit board by a wire, and a temperature sensing end of the temperature sensor passes through the through hole to be arranged outside the transparent lampshade to detect the temperature of water outside the transparent lampshade; in the case of being powered, the circuit board controls the LED lamp to display different colors of light according to the high/low temperature of the water detected by the temperature sensor, thereby, users are enabled to more easily know the water temperature of the water apparatus in which the device is installed.

DETAILED DESCRIPTION OF THE EMBODIMENT(S) OF THE INVENTION

Figure 4:
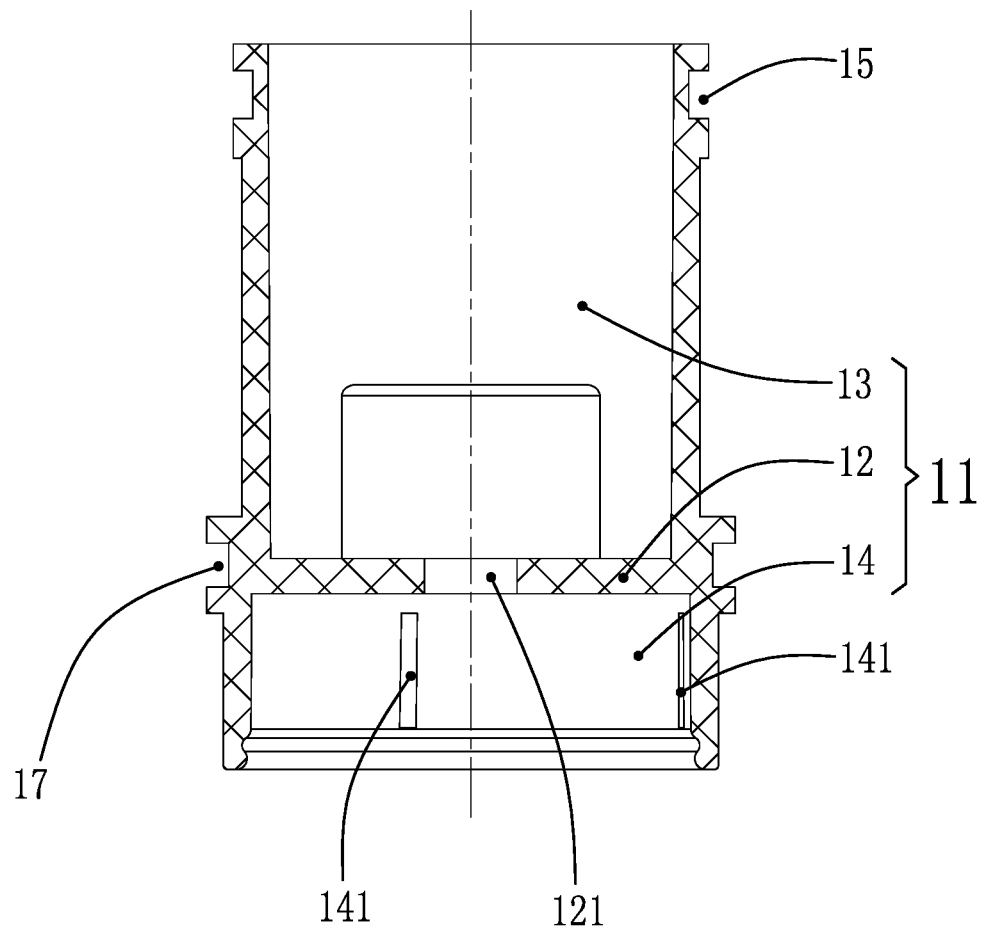
FIG. 4 is a first schematic cross-sectional view of the housing according to the embodiment of the present application.
Figure 5:
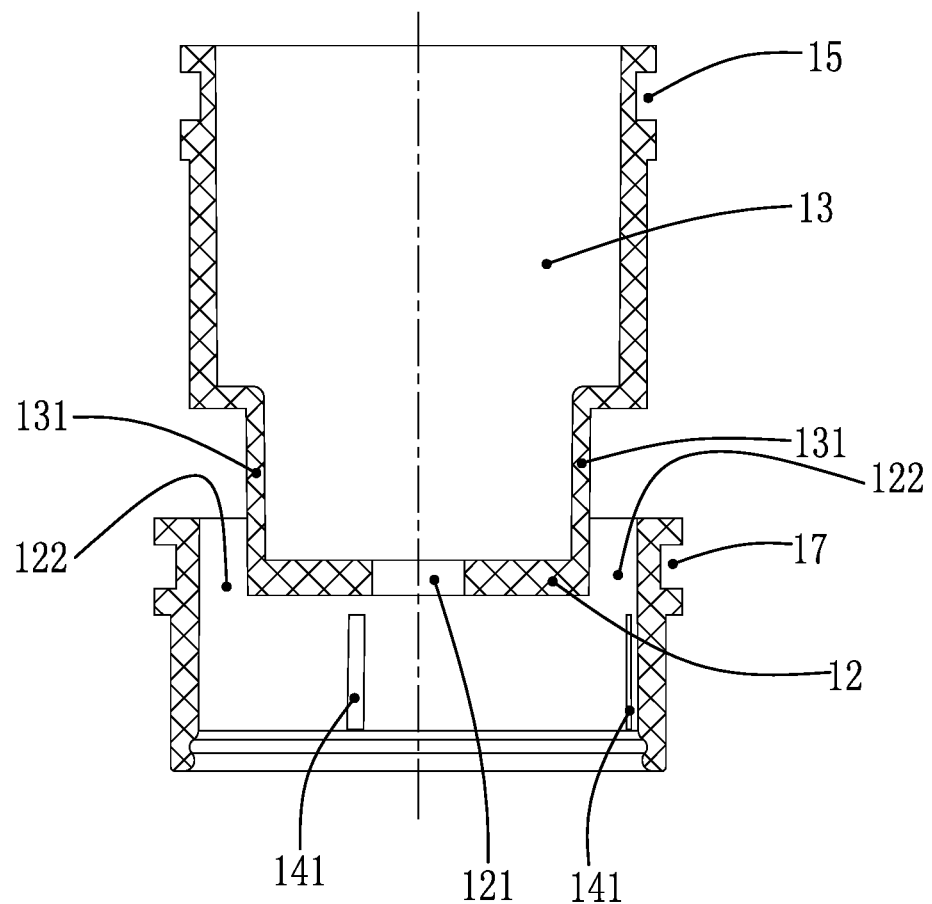
FIG. 5 is a second schematic cross-sectional view of the housing according to the embodiment of the present application.
Figure 6:
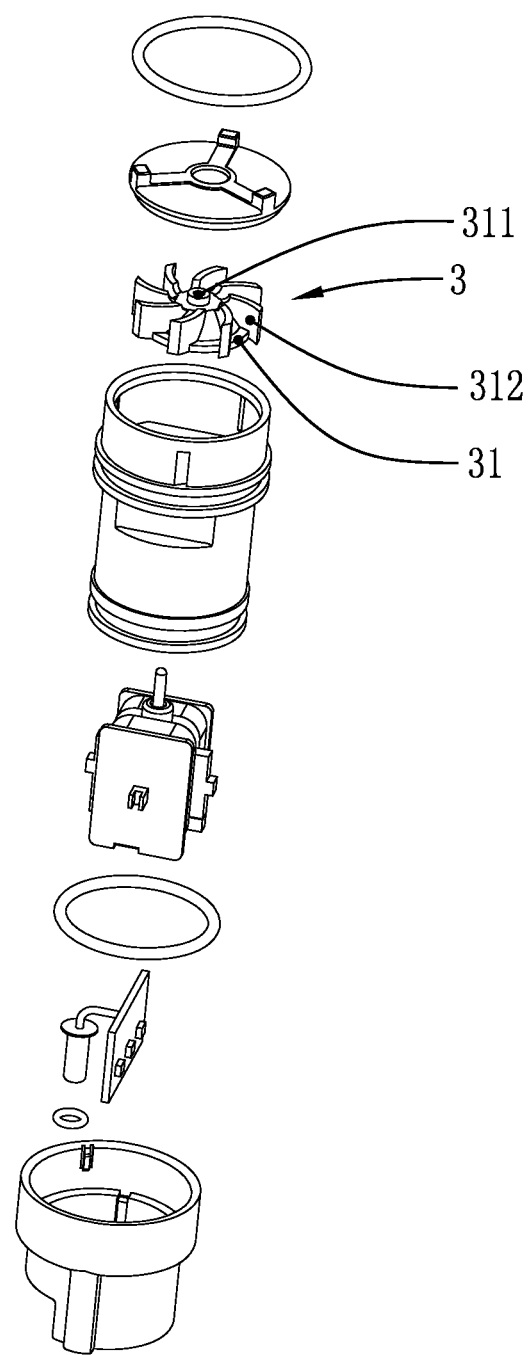
FIG. 6 is a second schematic exploded diagram of an embodiment of the present application.

As shown in FIGS. 1 to 13, a light-emitting assembly with a micro hydraulic power generator includes a power generation module and a light-emitting module 4. The power generation module is formed by assembling a housing 1, a coil module 2 and an impeller 3. An accommodating space 11 inside the housing 1, as shown in FIGS. 4 and 5, is divided into two cavities by a transverse baffle 12 therein, which are a coil cavity 13 and an impeller cavity 14, respectively. The transverse baffle 12 is provided with a first perforation 121 at the center thereof, and a side wall of the impeller cavity 14 is provided with multiple water inlets 141. Each of the water inlets 141 is provided in the form of an obliquely cutout 1411 and is formed by obliquely cutting into the interior from an outer wall of the impeller cavity 14. Two internally recessed portions 131 opposite to each other are provided at connection portions between an outer wall of the coil cavity 13 and the transverse baffle 12, and the transverse baffle 12 defines water outlets 122 at portions positionally corresponding to the internally recessed portions 131.

Figure 12:
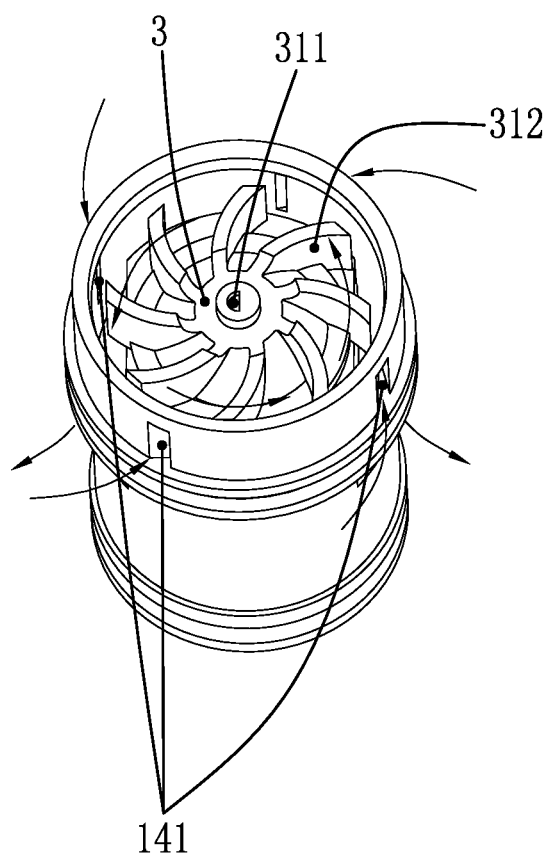
FIG. 12 is a second schematic diagram of the working principle of the embodiment of the present application.
Figure 16:
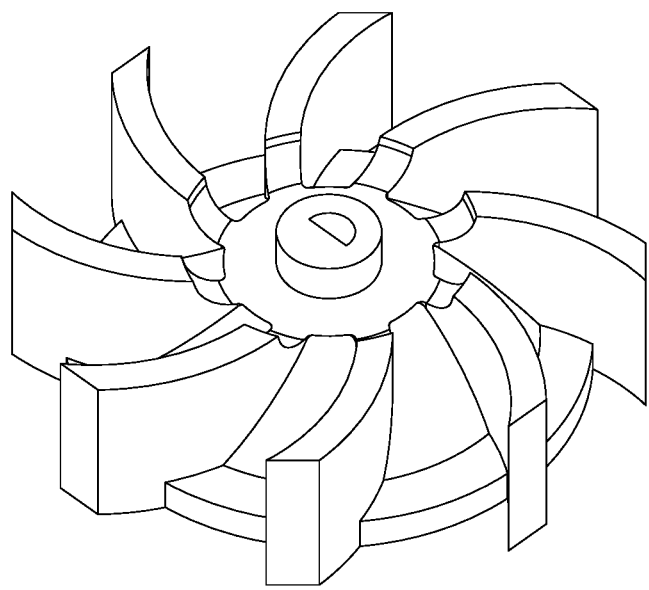
FIG. 16 is a schematic structural diagram of the impeller according to an embodiment of the present application.
Figure 21:
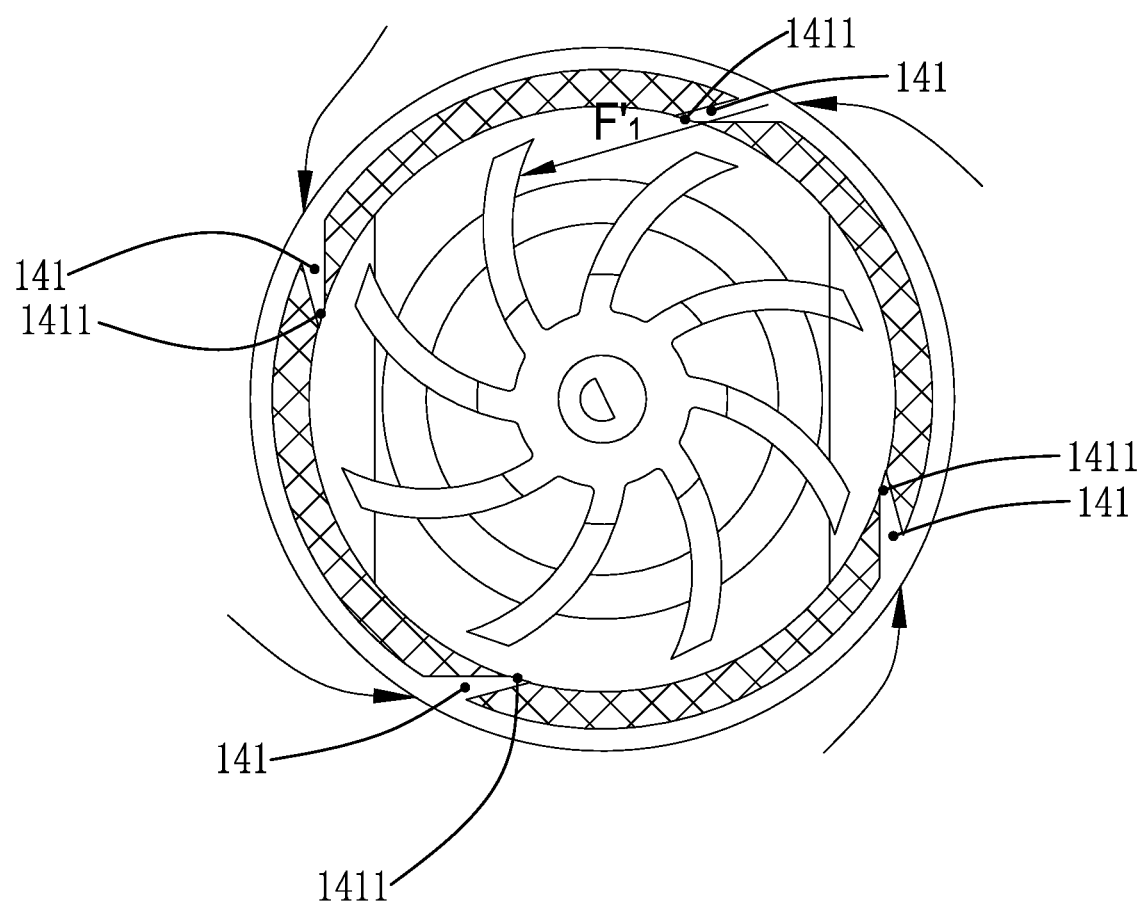
FIG. 21 is a schematic diagram of the force subjected by the impeller during water entry according to an embodiment of the present application.

As shown in FIGS. 12 and 16, the impeller 3 includes a conical base 31 and multiple blades 312. The conical base 31 is provided with a second perforation 311 at the center thereof, and the multiple blades 312 are arranged on an upper part of the conical base 31. The multiple blades 312 are vertically arranged on the conical base 31 to be intersected with the conical base 31, and the blades 312 extend outward from the center of the conical base and have the same circular-arc curvature. The impeller 3 is disposed in the impeller cavity 14, and an impeller cover 142 is provided at an outer end of the impeller cavity 14. As shown in FIG. 21, the side wall of the impeller cavity 14 is obliquely provided with four water inlets 141 evenly distributed in a circumferential direction. The cross section of each of the water inlets 141 forms an oblique cutout of a passage tapered from the outside to the inside. Water flow flows into the impeller cavity 14 after being obliquely cut and pressed by the water inlets 141, such that the water flow can directly impact an internally concaved surface of the blade 312 of the impeller 3, and the design of the tapered passage can increase the flow velocity and impact force of the water flow, and can achieve an especially good effect of impact on the blades 312, which facilitates the rapid rotation of the impeller 3 and improves the power generation efficiency.

Figure 9:
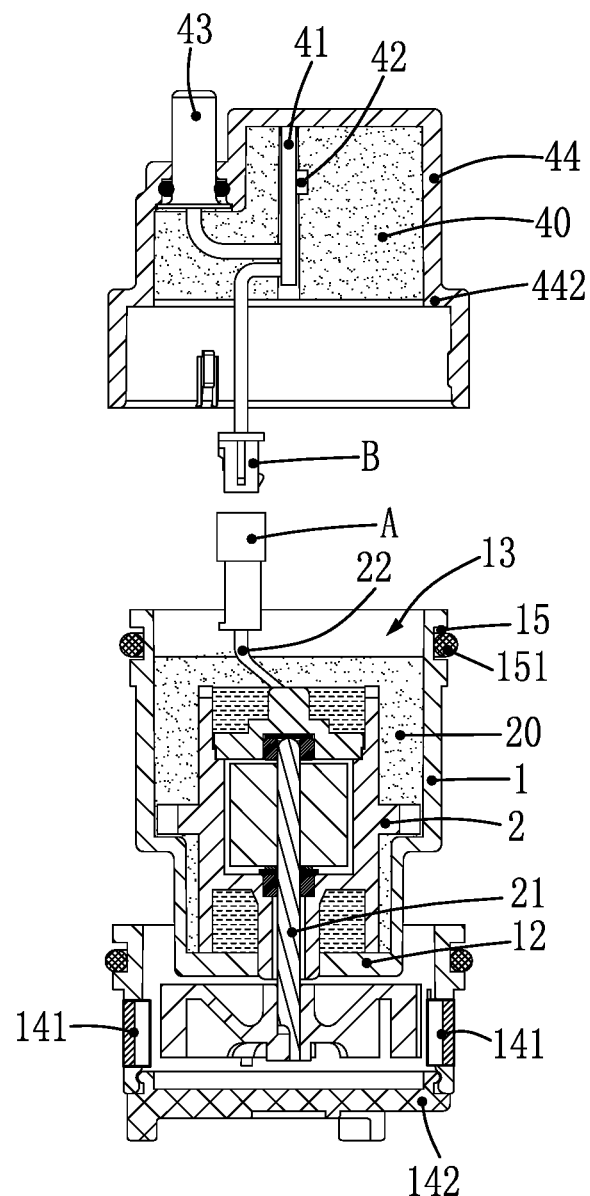
FIG. 9 is a first schematic cross-sectional view of an embodiment of the present application.
Figure 10:
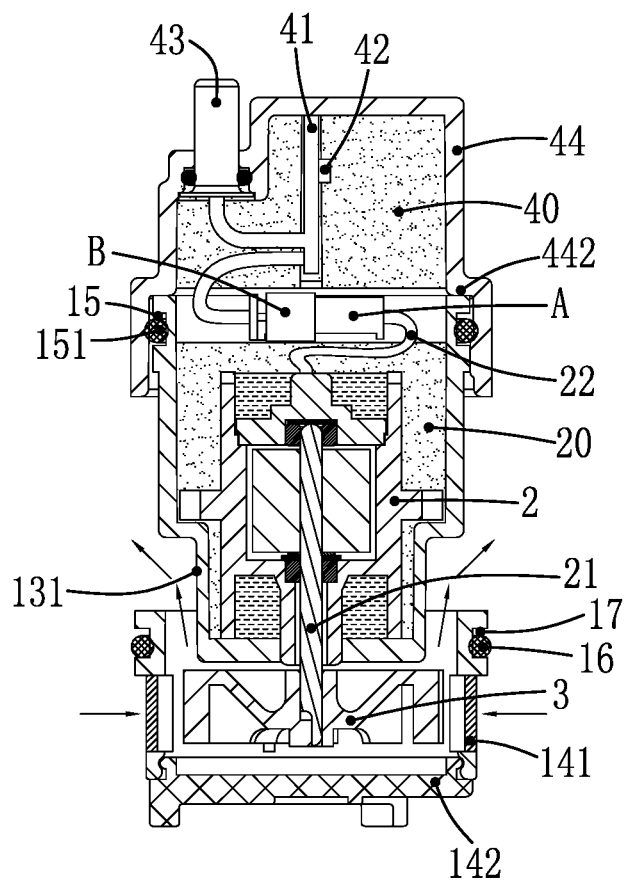
FIG. 10 is a second schematic cross-sectional view of the embodiment of the present application.

As shown in FIGS. 9 and 10, a coil module 2 is watertightly encapsulated in the coil cavity 13 by a colloidal material 20. The coil module 2 can be actuated by the rotation of an input shaft 21 thereon to generate power and output the power. The input shaft 21 of the coil module 2 passes through the first perforation 121 in the transverse baffle 12 and is fixedly connected to the second perforation 311 of the conical base 31 of the impeller 3 in the impeller cavity 14. A power output end 22 of the coil module 2 passes through the colloid material 20 and has a terminal A connected thereto outside the colloid material 20.

The light-emitting module 4 includes a circuit board 41, an LED lamp 42, a transparent lampshade 44 and a power cable. The circuit board 41 is provided with an LED lamp 42, the circuit board 41 and the LED lamp 42 are watertightly encapsulated by a transparent colloidal material 40. The entire light emitting module 4 is watertightly encapsulated in a transparent lampshade 44. One end of the power cable is connected to the circuit board 41, and the other end passes through the transparent colloidal material 40 and has a terminal B connected thereto outside the transparent colloidal material 40. The terminal A and the terminal B can be drawn from and plugged into each other to realize the on or off of the circuit. In this way, the electrical connection and disconnection of the coil module 2 and the circuit board 41 can be realized.

Figure 1:
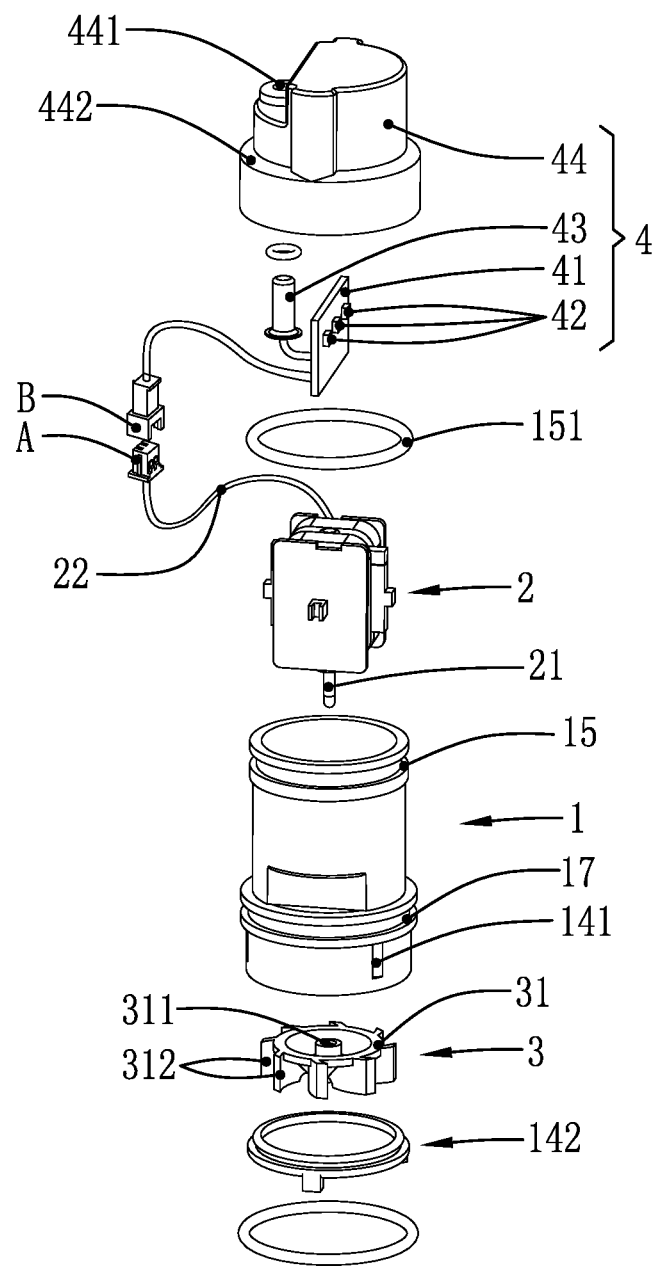
FIG. 1 is a first schematic exploded diagram of an embodiment of the present application.
Figure 2:
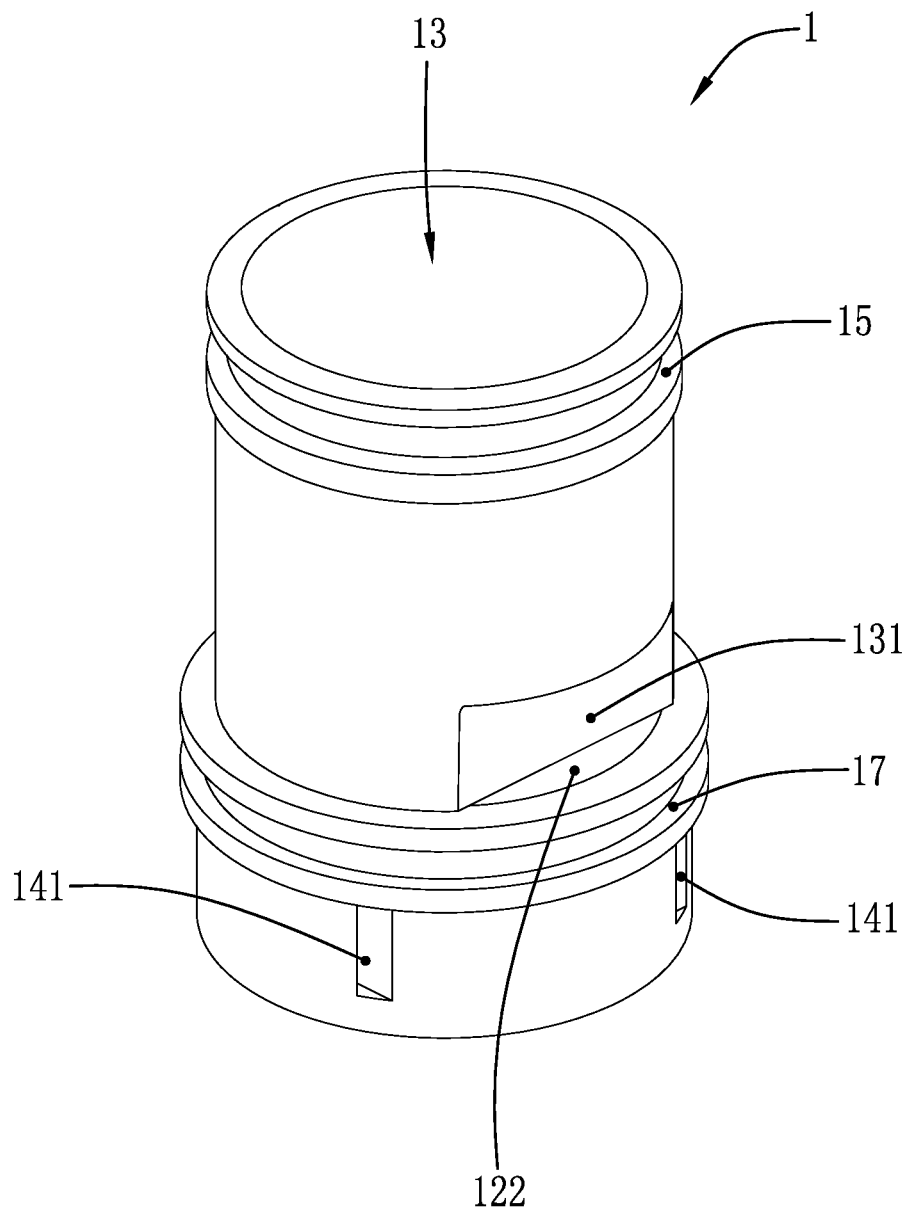
FIG. 2 is a first schematic structural diagram of a housing according to an embodiment of the present application.
Figure 3:
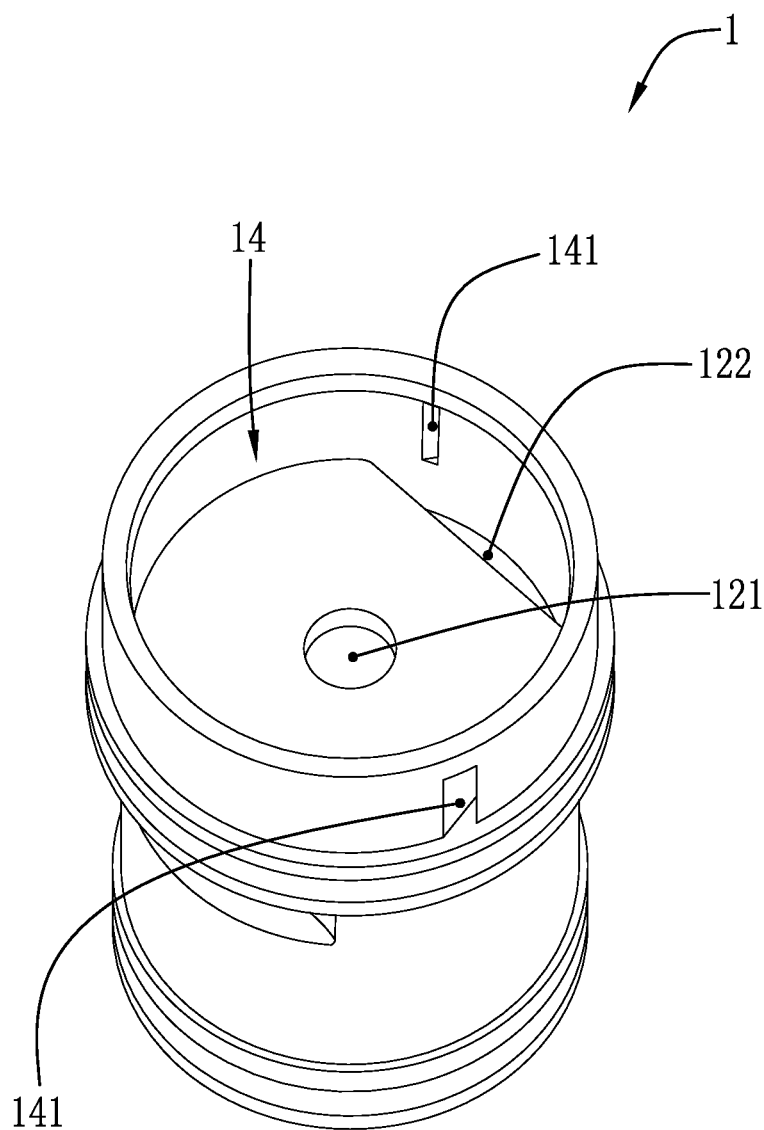
FIG. 3 is a second schematic structural diagram of the housing according to the embodiment of the present application.
Figure 7:
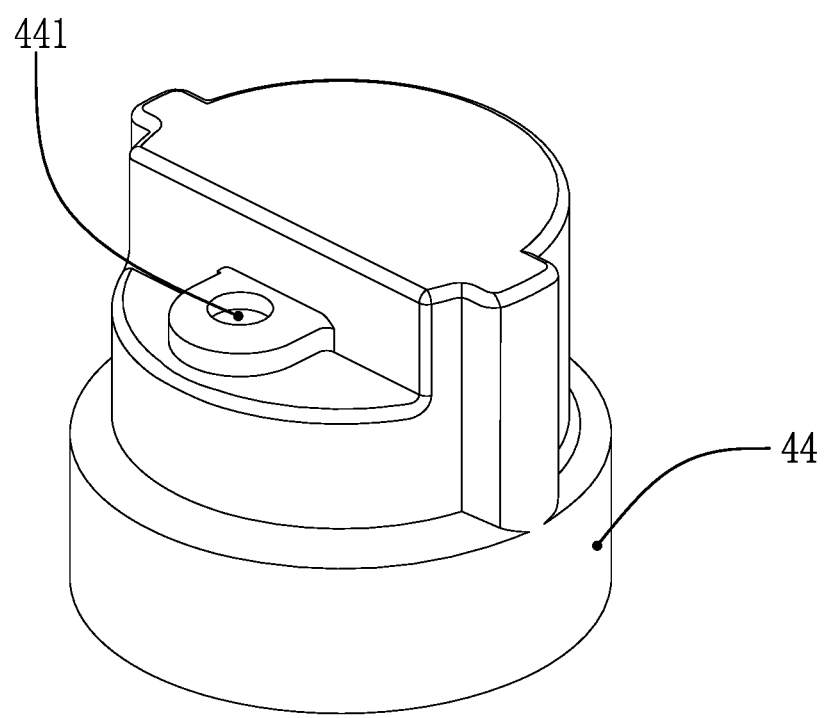
FIG. 7 is a first schematic diagram of a transparent lampshade according to an embodiment of the present application.
Figure 8:
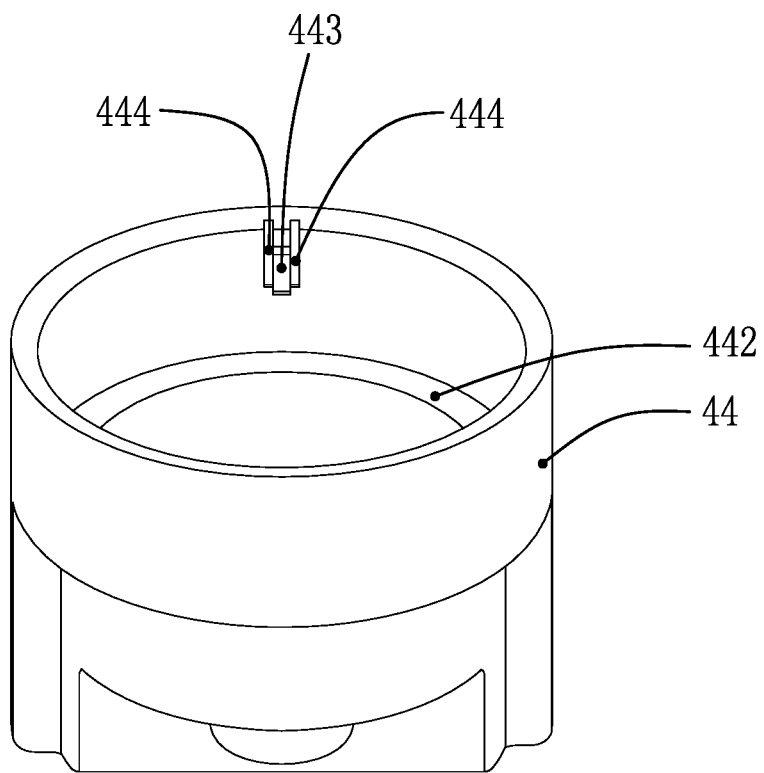
FIG. 8 is a second schematic diagram of the transparent lampshade according to the embodiment of the present application.
Figure 13:
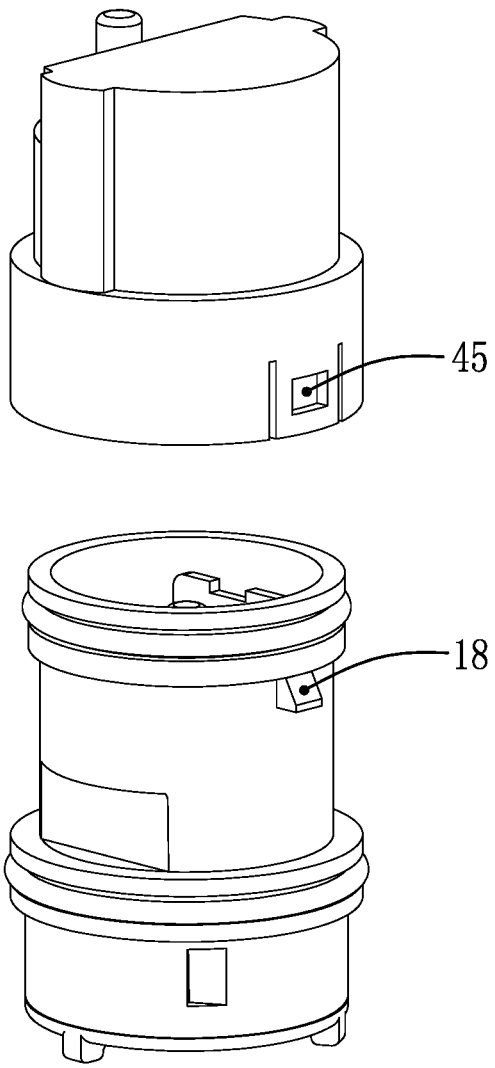
FIG. 13 is a schematic diagram of an embodiment of the present application in a disassembled state.
Figure 14:
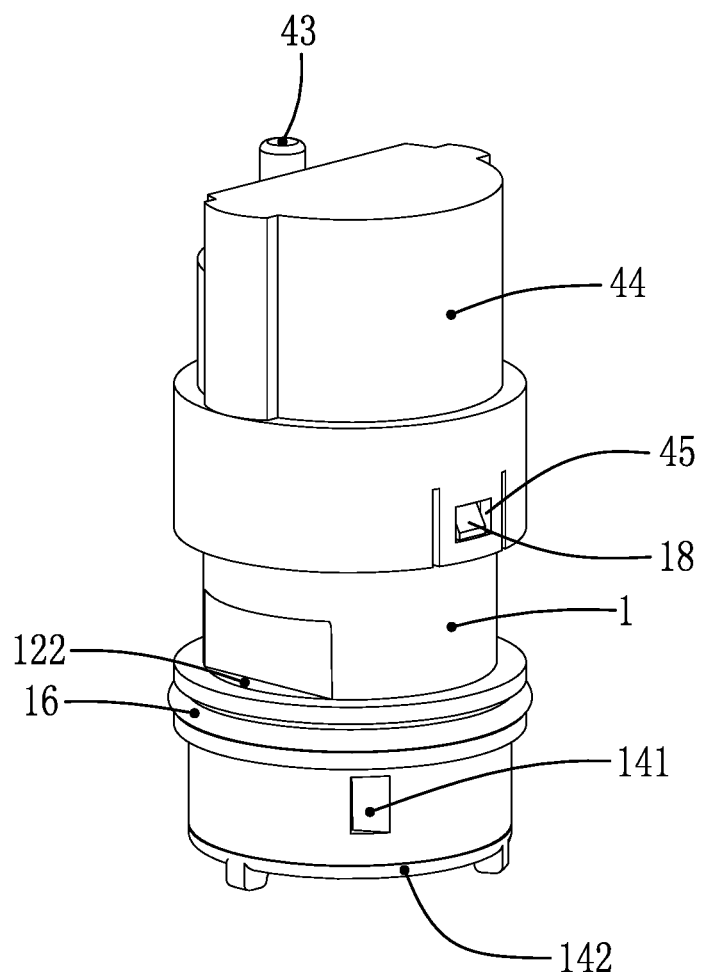
FIG. 14 is a schematic diagram of the embodiment of the present application in an assembled state.

The light-emitting module 4 and the housing 1 are detachably and hermetically assembled together, and the light-emitting module 4 is assembled at one end of the housing 1 close to the coil cavity 13. Specifically, as shown in FIGS. 13 and 14, an outer wall of the housing 1 is provided with an outwardly extending buckle 18, and the light-emitting module 4 is provided with a corresponding buckle hole 45 at a portion positionally corresponding to the buckle 18 when in an assembled state. When the light-emitting module 4 and the housing 1 are assembled together, the buckle 18 is stuck into the buckle hole 45, thus, a stable assembly is realized. The outer wall of the housing 1 is provided with a first annular groove 15 at an end facing the light-emitting module 4, and as shown in FIG. 1, a sealing ring 151 is nested in the first annular groove 15. An inner wall of the transparent lampshade 44 of the light-emitting module 4 is provided with a stepped edge 442 at a portion positionally corresponding to the an end of the housing 1 facing the light-emitting module 4 when in the assembled state, as shown in FIG. 8, the end of the housing 1 facing the light-emitting module 4 extends into the transparent lampshade 44 and abuts against the stepped edge 442, and the transparent lampshade 44 clamps the sealing ring 151 in the first annular groove 15 to be assembled to the housing 1 in a watertightly sealed manner. The inner wall of the transparent lampshade 44 is provided with a number of protruding bits 443 at portions positionally corresponding to the sealing ring 151, as shown in FIGS. 7 and 8, two sides of each of the protruding bits 443 are provided with grooves 444, such that in the process of assembling, the protruding bits 443 protrude when passing by the sealing ring 151, and in such case, the air in the transparent lampshade 44 can be discharged outwards from the grooves 444 at the two sides of each of the protruding bits 443, thus avoiding the difficulty in assembling resulted from poor internal air discharging in the process of assembling, and enabling the assembling to be easier and more convenient. When the assembling finishes, the protruding bits 443 are engaged to a lower side of the sealing ring 151, to ensure the tightness and firmness of the assembling. It is also convenient to dissemble the light-emitting module 4 from the housing 1, thus facilitating the replacement and maintenance when necessary.

The outer wall of the housing 1 is provided with a structure for assembling with other water devices. The outer wall of the housing 1 is additionally provided with a second annular groove 17, and a sealing ring 16 is arranged in the second annular groove 17, with such a design, the housing can be assembled to tubular parts of the water devices in a watertightly sealed manner. In practical use, the micro hydraulic power generator is assembled in the position where the water flow flows through, such as the inner tube of the shower, the faucet, etc.; the lampshade part is exposed to the visible position, and the water inlets 141 are placed at positions where the water flow rushes in.

Figure 11:
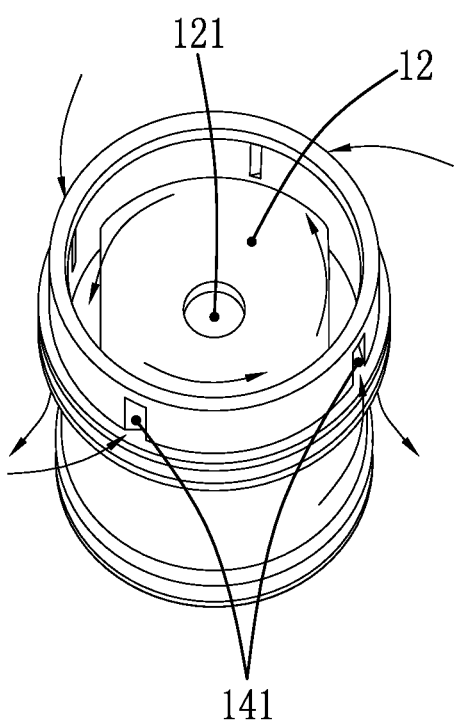
FIG. 11 is a first schematic diagram of the working principle of an embodiment of the present application.

As shown in FIGS. 11 and 12, when water flow flows, the water flow rushes into the multiple water inlets 141 in the side wall of the impeller cavity 14 and flows into the impeller cavity 14 after being obliquely cut and pressed by the water inlets 141, and impacts inner concave surfaces of the blades 312 of the impeller 3, and drives the impeller 3 to rotate. The water flow entering the interior of the impeller cavity 14 flows out from the two water outlets 122 of the transverse baffle 12. Since the coil cavity 13 of the housing 1 defines the two internally recessed portions 131, a larger flowing-through space can be formed, which facilitates the flowing out of the water inside the impeller cavity 14, such that the impeller 3 can rotate at a higher speed under the same water pressure. The impeller 3, while rotating, drives the input shaft 21 of the coil module 2 to rotate. In turn, the coil module 2 is actuated to generate power. The generated current is further transmitted to the terminal B through the terminal A of the power output end 22 of the coil module 2 to realize the power supply to the light-emitting module 4 to light the LED lamp 42. The LED lamp 42 in the light-emitting module 4 can be set to change between multiple colors or with a single color as required. Since the lampshade 44 and the colloidal material 40 are both transparent, the display of the LED lamp 42 is not adversely affected.

For a more optimized design, the light-emitting module 4 may be further provided with a temperature sensor 43. As shown in FIGS. 10 and 13, a sealed circuit of the circuit board 41 extends to the outside of the transparent colloidal material 40 and is connected to a temperature sensor 43. The transparent lampshade 44 is provided with a through hole 441. An electrical connection end of the temperature sensor 43 is disposed in the transparent lampshade 44 in a watertightly sealed manner and is connected to the circuit board by a wire. A temperature sensing end of the temperature sensor 43 passes through the through hole 441 to be arranged outside the transparent lampshade 44 to detect the temperature of water outside the transparent lampshade 44. The circuit board 41 can control the LED lamp 42 to display different colors of light according to the high/low water temperature detected by the temperature sensor 43.

When being powered, the light-emitting module 4 can display the color of the LED lamp 42 according to the temperature of the water contacted by the temperature sensor 43. The lampshade 44 and the colloid material 40, since being transparent, may not adversely affect the color of the LED lamp 42 observed from outside, so that the user can judge the current water temperature and avoid being scalded. In some embodiments, the color displayed by the LED lamp 42 corresponding to a proper water temperature may be preset, so that the user can quickly determine whether the water temperature is in a proper state.

It is a conventional technology to adjust the color of the LED lamp 42 by the temperature of the temperature sensor 43, so no further details are needed here.

Figure 15:
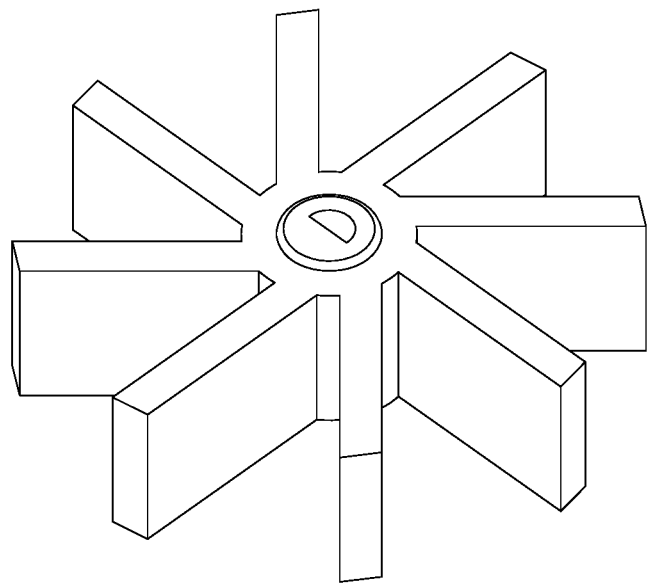
FIG. 15 is a schematic diagram of a conventional impeller with straight blades in the conventional technology.

Table 1 below shows data of experiment obtained from a comparison experiment between the voltage outputs in two technical solutions, i.e., the "impeller with arc-shaped blades and a conical base" in the present application in FIG. 16 and a "conventional impeller with straight blades" in the conventional technology in FIG. 15.

The experimental conditions are the same apparatus, the same test tool, the same motor for testing, the same load (200 ohms), and the data in the following table 1 are obtained:

TABLE 1

| Type | Water pressure (PSI) | | | | | | | | | |
|---|---|---|---|---|---|---|---|---|---|---|
| | 10 psi | 20 psi | 30 psi | 40 psi | 50 psi | 60 psi | 70 psi | 80 psi | 90 psi | 100 psi |
| output voltage (V) of impeller with arc-shaped blades and conical base | 2.8 | 4.1 | 4.8 | 5.3 | 5.4 | 5.6 | 5.7 | 5.8 | 5.9 | 6 |
| Output voltage (V) of conventional impeller with straight blades | 2 | 2.8 | 3.4 | 3.8 | 3.8 | 4.1 | 4.2 | 4.3 | 4.3 | 4.3 |
| Output voltage increase value (V) | 0.8 | 1.3 | 1.4 | 1.5 | 1.6 | 1.5 | 1.5 | 1.5 | 1.6 | 1.7 |
| Output voltage increase ratio | 40% | 46% | 41% | 39% | 42% | 37% | 36% | 35% | 37% | 40% |

Figure 17:
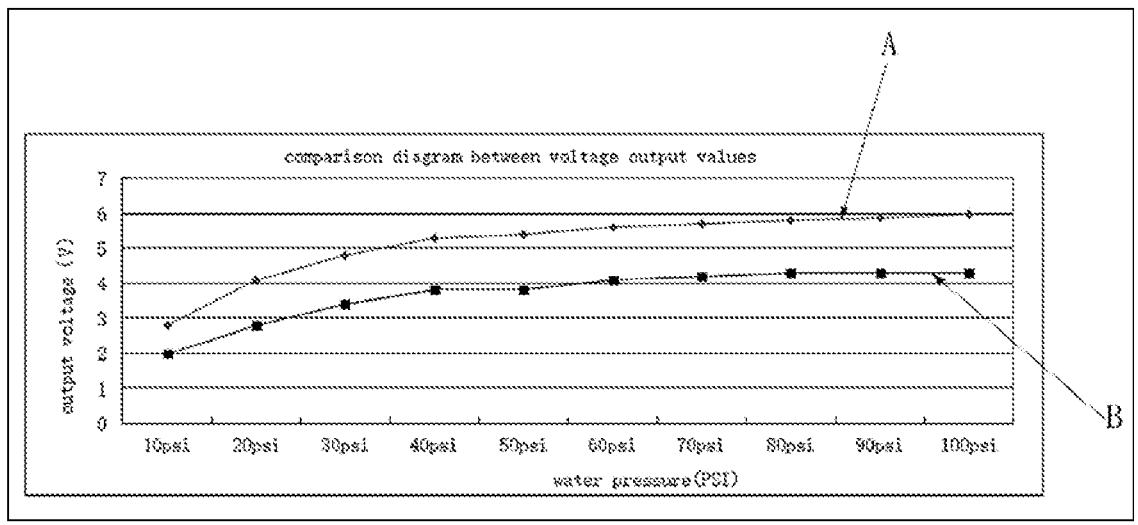
FIG. 17 is a diagram showing the comparison between output voltages in table 1.
Figure 18:
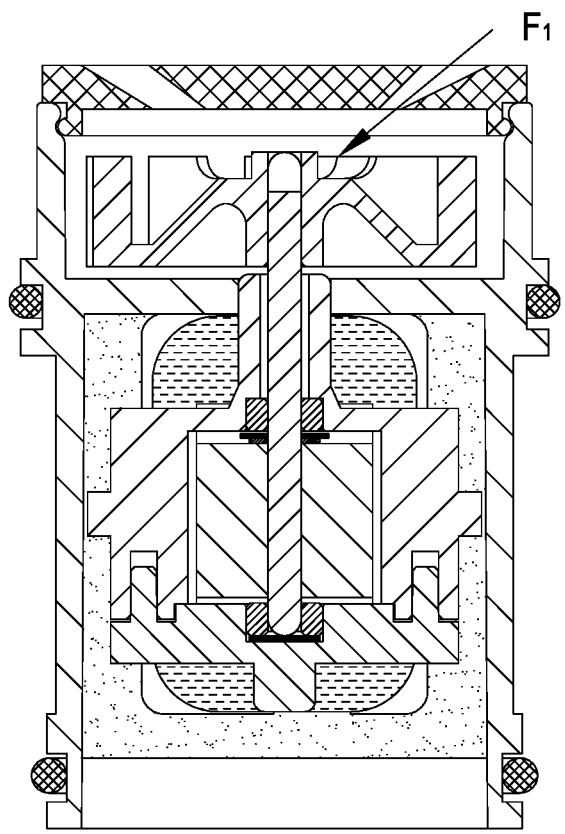
FIG. 18 is a schematic diagram showing the water entry from top in the conventional technology.
Figure 19:
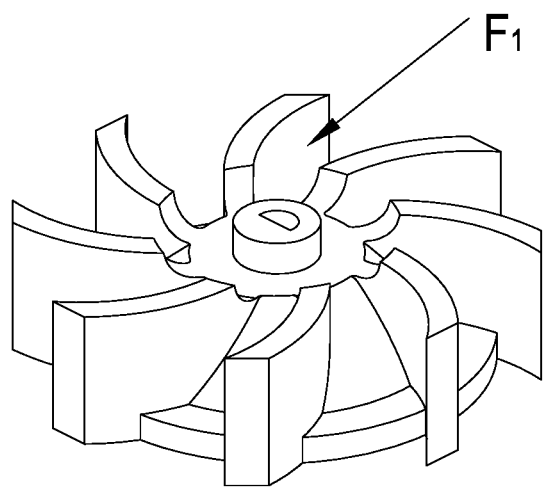
FIGS. 19 and 20 are schematic diagrams showing the force subjected by the impeller in FIG. 18.
Figure 20:
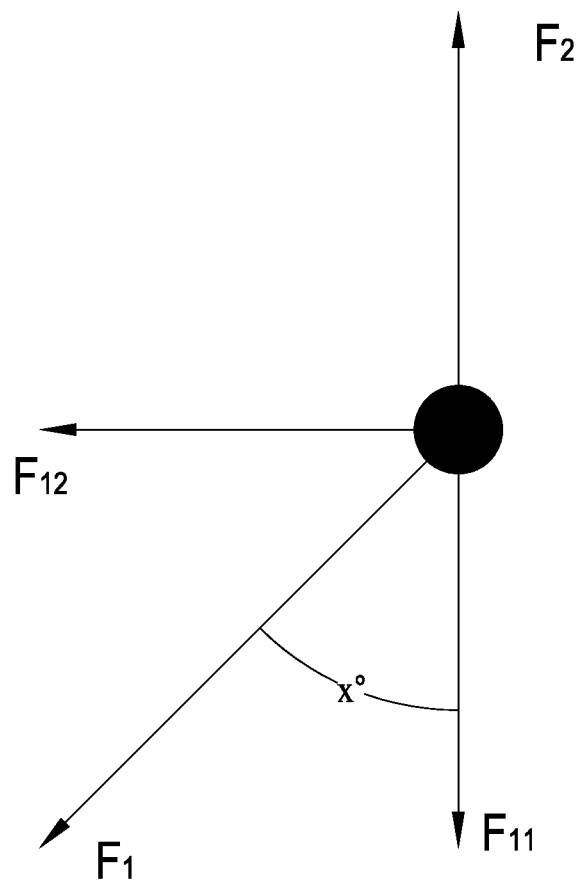

The data in Table 1 above prove that the "impeller with arc-shaped blades and conical base" according to the present application has an output voltage higher than that of the "conventional impeller with straight blades" of the previous comparison technology by 35% to 46%. A comparison chart prepared from the data in table 1 is as shown in FIG. 17, it can be known that under the same conditions, the output voltage of line A is significantly higher than the output voltage of line B, indicating that the performance of the product according to the present application has been significantly improved;

Further analyzing, when the same impeller structure is used and the water pressure is the same, there may be difference between the forces subjected by the impeller when being impacted by the water flows in cases that the water entry from top is used and the water entry from side defined by the present application is used, and the details are as follows:

As shown in FIGS. 18 to 20 which are schematic diagrams of the water entry from top, after the water enters from oblique top, the impact force F1 of the water flow is decomposed into forces in three directions. As shown in FIG. 20, the force towards the direction of rotation of the impeller $F_{12}$ is equal to F1 multiplied by sin X, $F_{12}$ is significantly lower than F1.

Figure 22:
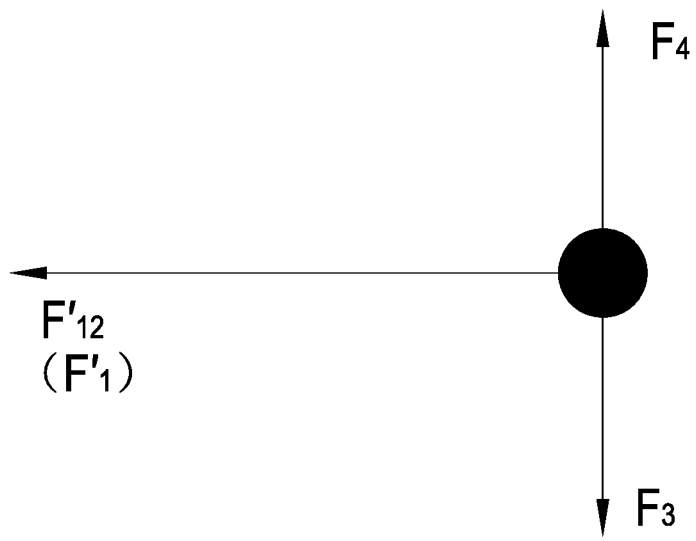
FIG. 22 is a schematic diagram of the force subjected by the impeller in FIG. 21.

FIGS. 21 to 22 show the structure of water entry from side according to the present application, as shown in FIG. 22, where the force towards the direction of rotation of the impeller $F'_{12}$ is equal to $F'_1$, $F'_{12}$ is the same as F1;

This means that under the same conditions, the impeller cavity with side water inlets can drive the impeller to rotate at a higher speed, therefore the power generation efficiency by water entry from side is better than that by water entry from top.

The above description merely relates to embodiments of the present disclosure, and is not intended to limit the design of the present disclosure. Any equivalent changes made according to key points of the design of the present disclosure will fall within the scope of protection of the present disclosure.

The invention claimed is:
1. A light-emitting assembly with a micro hydraulic power generator, wherein the light-emitting assembly comprises a power generation module and a light-emitting module, the power generation module comprises a housing, a coil module and an impeller, an accommodating space inside the housing is divided by a transverse baffle into two cavities, respectively a coil cavity and an impeller cavity, and the transverse baffle is provided with a first perforation at the center thereof, a side wall of the impeller cavity is provided with at least one water inlet, and at least one internally recessed portion is formed in an outer wall of the coil cavity, and the transverse baffle defines a water outlet at a portion positionally corresponding to the internally recessed portion;

the impeller is disposed in the impeller cavity, an impeller cover is provided at an outer end of the impeller cavity, the impeller comprises a conical base and a plurality of blades, the conical base is provided with a second perforation at the center thereof, and the plurality of blades are arranged on an upper part of the conical base and face towards the impeller cover, the blades are arranged vertically on the conical base to be intersected with the conical base, and the blades extend outwardly from the center of the conical base and have the same circular-arc curvature;

the coil module is watertightly encapsulated in the coil cavity by a colloidal material, an input shaft of the coil module passes through the first perforation in the transverse baffle and is fixedly connected to the second perforation in the conical base of the impeller, and a power output end of the coil module is arranged outside the coil cavity;

the light-emitting module comprises a circuit board, an LED lamp, a transparent lampshade, and a power cable, the circuit board is provided with an LED lamp, and the circuit board and the LED lamp are watertightly encapsulated by a transparent colloidal material, and the obtained part as a whole is encapsulated watertightly in the transparent lampshade, the power cable has one end electrically connected to the circuit board, and the other end passing through the transparent colloidal material to be electrically connected to the power output end of the coil module, with the transparent lampshade being detachably connected to the housing, the light-emitting module is detachably connected to the power generation module; and water flow flows in through the water inlet of the impeller cavity, driving the impeller to rotate, and further driving the input shaft of the coil module to rotate together, so that the coil module generates power and supplies the power to the light-emitting module, to light the LED lamp of the light-emitting module.

2. The light-emitting assembly according to claim 1, further comprising a temperature sensor, wherein the transparent lampshade is provided with a through hole, and an electrical connection end of the temperature sensor is disposed in the transparent lampshade in a watertightly sealed manner and electrically connected to the circuit board by a wire, and a temperature sensing end of the temperature sensor passes through the through hole to be arranged outside the transparent lampshade to detect the temperature of water outside the transparent lampshade; in the case of being powered, the circuit board controls the LED lamp to display different colors of light according to the high/low temperature of the water detected by the temperature sensor.

3. The light-emitting assembly according to claim 1, wherein the light-emitting module is assembled on an end of the housing close to the coil cavity.

4. The light-emitting assembly according to claim 3, wherein an outer wall of the housing is provided with a first annular groove at an end facing the light-emitting module, and a sealing ring is nested in the first annular groove, an inner wall of the transparent lampshade of the light-emitting module is provided with a stepped edge, and the end of the housing facing the light-emitting module extends into the transparent lampshade and abuts against the stepped edge, and the transparent lampshade clamps the sealing ring in the first annular groove to be assembled to the housing in a watertightly sealed manner.

5. The light-emitting assembly according to claim 4, wherein the inner wall of the transparent lampshade is provided with a number of protruding bits at portions positionally corresponding to the sealing ring, and two sides of each of the protruding bits are provided with grooves, such that air in the transparent lampshade is discharged outwards in assembling the transparent lampshade to the housing.

6. The light-emitting assembly according to claim 3, wherein the outer wall of the housing is provided with an outwardly extending buckle, and the light-emitting module is provided with a corresponding buckle hole at a portion positionally corresponding to the buckle in an assembled state, and when the light-emitting module is assembled to the housing, the buckle is stuck in the buckle hole to realize a stable assembly.

7. The light-emitting assembly according to claim 1, wherein the power output end of the coil module is provided with a terminal A, and the power cable of the circuit board is also provided with a terminal B at an outer end passed through the transparent colloidal material, the circuit is on or off by the terminal A and the terminal B being drawn from and plugged into each other.

8. The light-emitting assembly according to claim 1, wherein the side wall of the impeller cavity is provided with a plurality of water inlets obliquely, and the cross section of each of the water inlets forms a passage tapered from the outside to the inside, and water flow flows into the impeller cavity after being obliquely cut and pressed by the water inlets, and the impacting direction of the water flow is toward internally concaved surfaces of the blades of the impeller.

9. The light-emitting assembly according to claim 1, wherein the side wall of the impeller cavity is provided with four water inlets evenly distributed in a circumferential direction.

10. The light-emitting assembly according to claim 1, wherein the outer wall of the housing is provided with at least one second annular groove, and a sealing ring is provided in the second annular groove.

* * * * *